US008786400B2

(12) United States Patent
Harkins et al.

(10) Patent No.: US 8,786,400 B2
(45) Date of Patent: Jul. 22, 2014

(54) ACCESS CONTROL SYSTEM

(75) Inventors: Michael T. Harkins, Portland, OR (US); Casey Fale, Portland, OR (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 311 days.

(21) Appl. No.: 13/373,418

(22) Filed: Nov. 14, 2011

(65) Prior Publication Data

US 2012/0126936 A1 May 24, 2012

Related U.S. Application Data

(63) Continuation of application No. 11/422,775, filed on Jun. 7, 2006, now Pat. No. 8,058,971.

(51) Int. Cl.
*G05B 19/02* (2006.01)
*G08B 29/00* (2006.01)

(52) U.S. Cl.
USPC ............ 340/5.2; 340/5.73; 340/5.28; 340/5.5

(58) Field of Classification Search
USPC .................................. 340/5.2, 5.73, 5.28, 5.5
See application file for complete search history.

(56) References Cited

U.S. PATENT DOCUMENTS 4,594,637 A 6/1986 Falk
4,727,368 A 2/1988 Larson et al.
4,766,746 A 8/1988 Henderson et al.
4,851,652 A 7/1989 Imran
4,916,443 A 4/1990 Barrett et al.
5,280,518 A * 1/1994 Danler et al. ............ 379/102.06
5,459,458 A 10/1995 Richardson et al.
5,475,375 A 12/1995 Barrett et al.
5,550,529 A * 8/1996 Burge ............................ 340/5.6
5,602,536 A 2/1997 Henderson et al.
5,815,557 A * 9/1998 Larson ......................... 340/5.64
5,999,095 A * 12/1999 Earl et al. ...................... 340/542
6,006,068 A * 12/1999 Elkin et al. ................... 340/7.44
6,072,402 A 6/2000 Kniffin et al.
6,472,973 B1 10/2002 Harold et al.
6,912,410 B2 6/2005 Auten et al.
7,606,558 B2 * 10/2009 Despain et al. ............... 455/410
7,620,015 B2 * 11/2009 Lenzarini ...................... 370/331
7,880,584 B2 2/2011 Larson et al.
2001/0028295 A1 10/2001 Brinkmeyer et al.
2003/0179075 A1 * 9/2003 Greenman ................... 340/5.54
2003/0231103 A1 * 12/2003 Fisher .......................... 340/5.73
2004/0160304 A1 * 8/2004 Mosgrove et al. ........... 340/5.21
2005/0074023 A1 4/2005 Wall
(Continued)

FOREIGN PATENT DOCUMENTS

EP 1562153 A2 8/2005

*Primary Examiner* — Daniel Wu
*Assistant Examiner* — John Bamert
(74) *Attorney, Agent, or Firm* — Cantor Colburn LLP

(57) ABSTRACT

An access device for a system having at least one lock that is configured to receive instructions and to energize a lock mechanism to unlock the at least one lock and a computer is disposed at a remote location from the at least one lock and the access device. The computer is connected to a primary wireless communication path. The access device comprises at least one key configured for communicating with the computer via the primary wireless communication path and to communicate with the lock over a secondary wireless communications path and wherein the at least one key further is configured as authorized to unlock the at least one lock absent a de-authorizing instruction from the computer.

19 Claims, 2 Drawing Sheets

(56) References Cited

U.S. PATENT DOCUMENTS

| | | | | |
|---|---|---|---|---|
| 2005/0264400 | A1* | 12/2005 | Fisher | 340/5.73 |
| 2006/0092644 | A1 | 5/2006 | Mok et al. | |
| 2006/0170533 | A1* | 8/2006 | Chioiu et al. | 340/5.61 |
| 2007/0131005 | A1 | 6/2007 | Clare | |
| 2007/0176739 | A1* | 8/2007 | Raheman | 340/5.64 |
| 2007/0290797 | A1 | 12/2007 | Harkins et al. | |

* cited by examiner

ACCESS CONTROL SYSTEM

This patent application is a continuation of U.S. patent application Ser. No. 11/422,775, filed Jun. 7, 2006, now U.S. Pat. No. 8,058,971 entitled "ACCESS CONTROL SYSTEM" by Michael T. Harkins et al., the entire disclosure of which is incorporated herein by reference.

BACKGROUND OF THE INVENTION

1. Field of the Invention

The present invention relates generally to access control systems and, more particularly, to wireless access control systems.

2. Related Art

Wireless control of access control systems for securing buildings and the like is described in various documents. For example, U.S. Pat. No. 6,072,402 illustrates a secure entry system including a lock having an integrated RF receiver and a clearing house connected to a database. A user, who seeks access, communicates via a fixed or mobile phone with the clearing house. If the clearing house determines, by reference to the database, that the user should be authorized to access the lock, the clearinghouse causes a transmission to the lock to be made. This authorization is valid for only a short time such as thirty minutes.

U.S. Pat. No. 6,472,973 describes adding a wireless radio link to a lock box to transfer the data obtained from an access key pad, located on the lock box, to a co-located collector transmitter unit which sends the data to a central site computer. The collector-transmitter unit is installed in the lock box to intercept the exchange of information between the key pad and the lock box and transmit this data by radio to a nearby receiver unit. [0004] However, to date, no suitable device or method of providing easy, reliable and secure access to an entryway is available.

BRIEF DESCRIPTION OF THE INVENTION

In accordance with one aspect of the present invention, an access system comprises at least one lock configured to receive instructions and to energize a lock mechanism to unlock the at least one lock. A computer is disposed at a remote location from the at least one lock, and communicates over a wireless communication path to at least one key. The at least one key is also configured for communicating with the at least one lock over a secondary wireless path and wherein the at least one key is further configured as authorized to unlock the at least one lock absent a de-authorizing instruction from the computer. In another aspect of the invention, should the at least one key not detect proper access to the primary wireless communications path for the some previously set time frame, the at least one key will de-authorize itself until primary wireless communication access is re-established.

In accordance with another aspect, a method of controlling access that utilizes at least one lock configured to receive instructions and to provide input to a lock mechanism to unlock the at least one lock, comprises storing authorization status data concerning at least one key on a computer located remote from the lock; using the at least one key to unlock the at least one lock absent a de-authorizing instruction from the computer received over a primary wireless communication path; using the at least one key to send an instruction to unlock the at least one lock over a secondary wireless path. In still another aspect of the invention, should the at least one key not detect proper access to the primary wireless communications path for the some previously set time frame, the at least one key will de-authorize itself until primary wireless communication access is re-established.

In a further aspect of the invention, an access device for a system having at least one lock is configured to receive instructions and to energize a lock mechanism to unlock the at least one lock and a computer is disposed at a remote location from the at least one lock. The computer receives authorization instructions for at least one access device over a primary wireless communication path. The access device comprises at least one key configured for communicating with the computer via the primary wireless communication path and to communicate with the lock over a secondary wireless path and wherein the at least one key further is configured as authorized to unlock the at least one lock absent a de-authorizing instruction from the computer. In another aspect of the invention, should the at least one key not detect proper access to the primary wireless communications path for the some previously set time frame, the at least one key will de-authorize itself until primary wireless communication access is re-established.

BRIEF DESCRIPTION OF THE DRAWINGS

The following detailed description is made with reference to the 20 accompanying drawings, in which.

DETAILED DESCRIPTION OF THE PREFERRED EMBODIMENT

One embodiment of the present invention concerns a device and a method for providing security that is less cumbersome and easier to use relative to current systems. For example, rather than requiring that authorization be obtained prior to gaining access, in this embodiment, authorization for a key to access a building or an entryway is set as valid unless the key is instructed otherwise, or the key has not detected proper access to the primary wireless communications path for the some previously set time frame. In this case, the key will de-authorize itself until primary wireless communication access is re-established.

In this embodiment, a secured system comprises a computer, a key configured to communicate with the computer and a lock that is configured to receive instructions from the key. As used herein, the term computer may refer to any device or devices capable of carrying out a set of instructions such as one or more processors, servers or microprocessors. Also, as used herein, the term key may refer to any device or devices for controlling or accessing operation of another device and the term lock may refer to any device or devices for preventing access to an opening such as that covered by a door.

Figure 1:
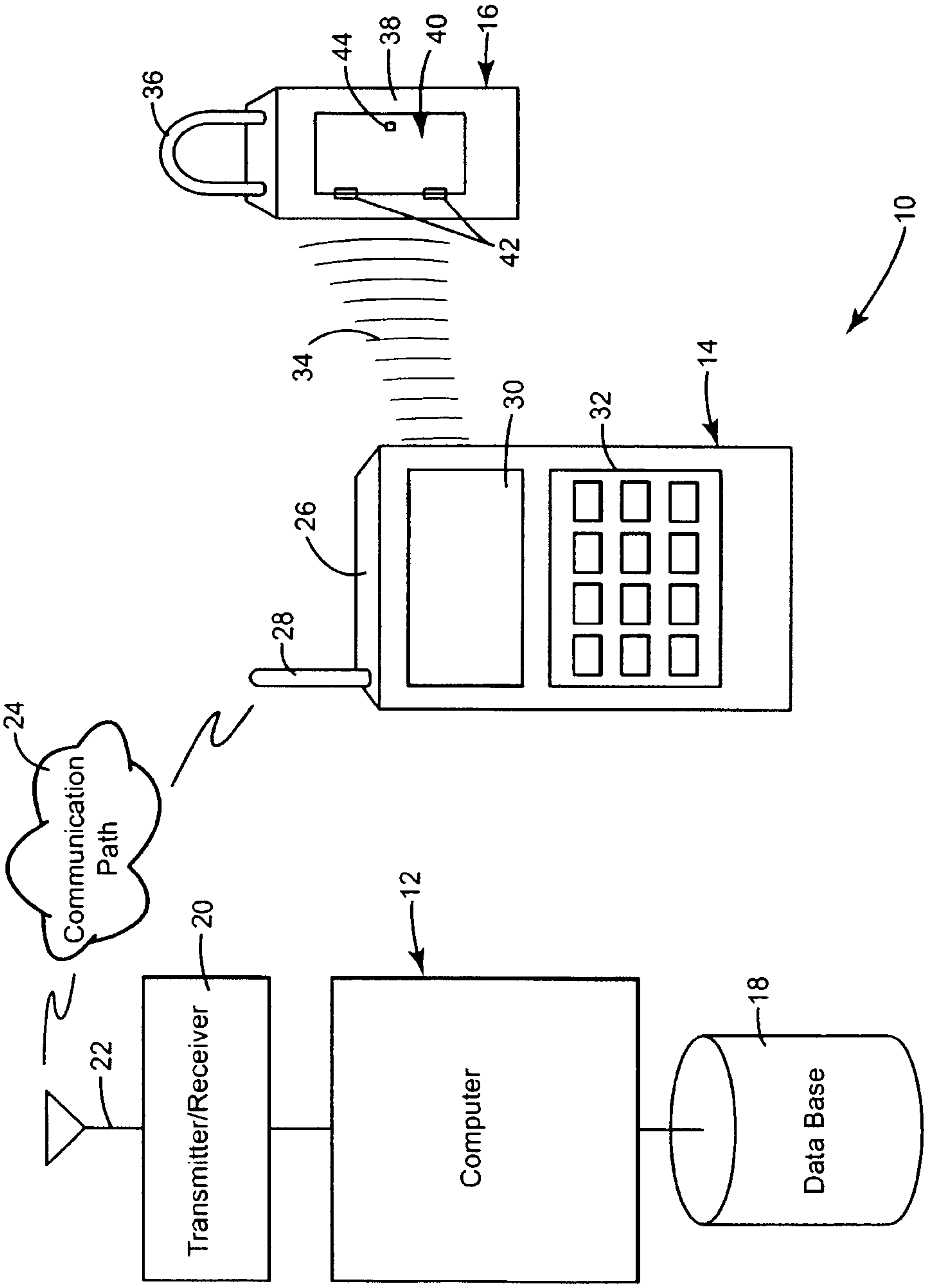
FIG. 1 is a perspective view, party in schematic, of an access control system showing a computer, a key and a lock in accordance with an embodiment of the present invention.

Referring now to FIG. 1, a security or access system, in accordance with an embodiment of the present invention, is illustrated generally at 10. In this embodiment, the access system 10 is configured for use in real estate sales, although, it will be understood that this is only one embodiment and one of ordinary skill in the art would readily adapt this embodiment of the invention for other applications such as for a delivery truck or industrial site security. As illustrated, the access system 10 comprises a computer 12, a key 14 and a lock 16. It will be appreciated that in this embodiment, and although not illustrated as such, the access system 10 comprises a plurality of computers 12, keys 14 and/or locks 16.

The computer 12, is any known device for following a set of instructions, such as those contained in software and/or firmware, and is interconnected with, or includes, a database 18 and a transmitter/receiver 20. The database 18 includes in one embodiment information concerning unique identifiers for the keys 14, unique identifiers for each lock 16, information concerning a particular real estate agent, house showing particulars, house alarm system particulars, other arrangements for showing the house, location of a particular lock, etc. The transmitter/receiver 20 is preferably capable of communicating over a wireless telecommunication system, although, any suitable wireless communication system such as RF or wireless internet may be employed. The transmitter/receiver 20 communicates via an external or internal antenna 22 over a primary communication path 24, which, in the case of a wireless telecommunication system, comprises multiple communication cells.

As illustrated, the key 14 transmits/receives signals from the transmitter/receiver 20 via the primary communication path 24. Preferably, the signals are encrypted or subject to a security code scheme that changes, such as by hopping or rolling in a known manner, periodically, e.g., every twenty-four hours. In one embodiment, the key 14 comprises a shell or housing 26, an antenna 28, a display 30 and a key pad 32. The housing 26, as illustrated, has a slim outer configuration, e.g. having a dimension of less than about one inch (2.54 centimeters) in depth and comprises an inner cavity (not shown). The housing 26 is fabricated in any known manner, for example, by injection molding of a plastic or other similar material. The antenna 28 is configured in a known manner to transmit/receive signals sent over the primary communication path 24 and the display 30 is of any type that presents a suitably clear image such as a liquid crystal. The key pad 32 is any configuration that is suitably durable and easy to use, for the entry of data as described in more detail below. The key 14 is further configured, as also described in more detail below, to communicate with the lock 16, via signals 34.

The lock 16, as illustrated, is configured as a lock box used in real estate sales and, as such, is removably mountable, e.g., to a door of a residence (both not shown), via a bracket 36. The lock 16 has a housing 38 that, in one aspect, includes a door 40 which, in turn, comprises hinges 42 and a knob 44. The bracket 36, the housing 38 and door 40 comprises a material, such as a metallic material, that is sufficiently strong and durable to prevent damage or unauthorized access. A compartment (not shown) accessed via the door 40 may contain, e.g., a mechanical door key (not shown) for unlocking the door of the residence.

Figure 2:
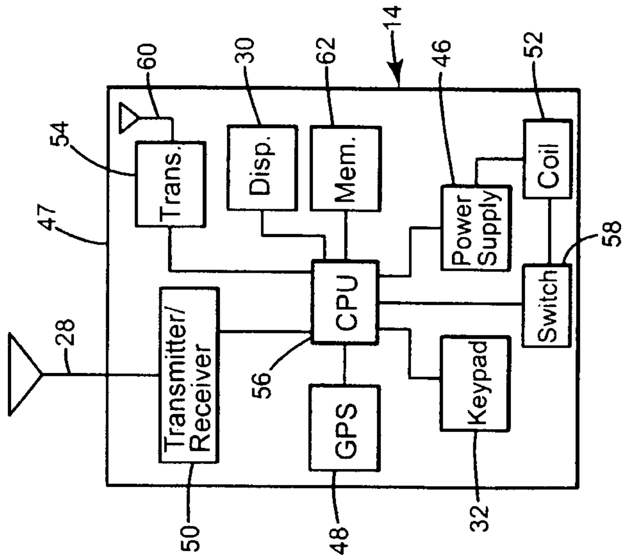
FIG. 2 is a schematic diagram of the key of FIG. 1.

Referring now to FIG. 2, one embodiment of a circuit 47 that may be located within the inner cavity (not shown) of the housing 26 (FIG. 1) of the key 14 is shown. The key 14 in one embodiment comprises a circuit having a power source 46, a global position satellite (GPS) receiver 48, a transmitter/receiver 50, an energizing coil 52, a transmitter 54 and a central processing unit (CPU) 56 connected in circuit with each of the foregoing. The power supply 46 comprises any self-contained source such as a battery, which preferably is rechargeable, and that is able to energize each of the electrical components of the circuit 47, as will be appreciated, for a reasonable period of time. In an optional embodiment, a GPS receiver 48 is employed to provide position coordinates to the CPU 56, for example, for confirming the location of a particular lock 16. The transmitter/receiver 50 is connected to the antenna 28, as described above, and is configured for communicating, via the primary communication path 24, information sent to/from the CPU 56. As such, the transmitter/receiver 50 is preferably capable of cellular communications, however, the transmitter/receiver 50 is capable of receiving signals via other means of communications, e.g., WIFI or RF.

In another optional embodiment, a coil 52 is connected to a switch 58 controlled by the CPU 56 for assisting in energizing the lock 16 through magnetic/electrical field coupling with a coil (described in more detail below) that is located at the lock 16. The CPU 56 is configured to control the switch 58 to energize the coil 52, when the accessing the lock 16. An additional transmitter 54 and antenna 60 are provided for communicating instructions via a secondary communications path from the CPU 56 to the lock 16. The transmitter 54 is preferably configured for infrared communications (IRDA), or near field wireless communication and thus may use a frequency that is appropriate for such a short distance. One embodiment includes a system that functions in the 300 to 400 MHz range and that has a changing code scheme that corresponds to that employed in the primary communication path 24, as described above. In another embodiment the transmitter 54 is configured to communicate using optical technology, such as at an infrared frequency.

The CPU 56 comprises any processor, microprocessor, controller, or other device that is configured to follow a set of instructions provided in software and/or firmware instructing the CPU, for example, to receive input via the key pad 32, send/receive data/instructions from the computer 12, display information to a user and send instructions to the lock 16. To assist in accomplishing the foregoing, the CPU 56 is connected in circuit with a memory device 62. The memory device 62 comprises an erasable programmable read only memory, random access memory or any other suitable memory device for storing instructions for operating the CPU 56 and for storing data transmitted to/from the computer 12. Also, where the transmitter/receiver 50 is located out of a service area as occurs during cellular communications, the memory 62 is configured for providing spooling of usage data such as time of access of a particular lock 16, duration of access to the particular lock and/or location of the particular lock.

Figure 3:
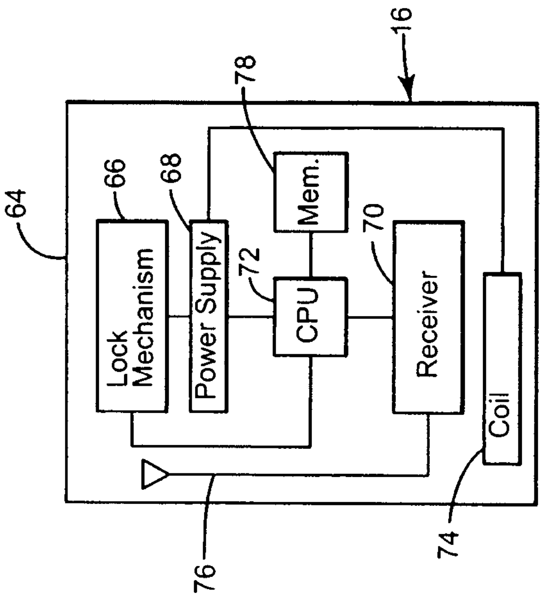
FIG. 3 is a schematic diagram of the lock of FIG. 1.

Referring now also to FIG. 3, an embodiment of a circuit 64 that is located in the compartment (not shown) of the lock 16 comprises a lock mechanism 66, a power supply 68, a receiver 70 and a CPU 72. The lock mechanism 66 comprises any suitable device for providing access through the door 40 (FIG. 1) as described above. The power supply 68 is similar to the power supply 46 described above and, in one embodiment, comprises a rechargeable battery. In another optional embodiment, the power supply 68 is connected in circuit with a coil 74 that functions to receive energy from the coil 52 for assisting in powering the circuit 64 and/or recharging the power supply. The receiver 70 is configured to communicate with the transmitter 54, as described above, via an antenna 76.

The CPU 72 is similar to the CPU 56 and may be any processor, microprocessor, controller, or other device that is configured to follow a set of instructions provided in software and/or firmware. The CPU 72 may function, to, among other things, receive instructions from a particular key 14 via the receiver 70 and, in response thereto, energize a particular lock mechanism 66 for access by an operator as described above. The CPU 72 is connected in circuit with a memory device 78 that is similar, and performs a similar function, to the memory device 62 described above.

With reference to FIGS. 1-3, an embodiment of the present invention will now be described in the application of real estate sales, although, it will be appreciated that this is merely for illustration. Also, in this application, a particular lock 16 comprises a lock box that is located at an opening of a building (not shown) that is available for sale. Access to the building may be granted by virtue of the owner giving the listing real estate agent the physical key to the house. Any agent authorized to show houses in the listing board's area has an assigned key 14*s*, and can access the house. The agent's authorization status is communicated to the computer 12 for entry into the database 18. Any change of the agent's authorization status is also communicated to the computer 12 for entry into database 18, Once this change in authorization status data is entered into the database 18, the computer 12 is configured to communicate this authorization information to the key 14 assigned to that agent. The CPU 56 of the key 14 is configured to store this authorization status data in the associated memory device 62. The CPU 56 is further configured to operate on a valid status marking as long as the key 14 maintains an active connection to the primary communication path 24 for greater than some set valid time window, for example, a five-minute time period, within the automatic authorization time period of, for example twenty-four hours. If the key 14 has not achieved the access to the primary communication path 24 for the valid time window within the automatic authorization time period, the CPU 56 is configured to operate as if the authorization is invalid and to prevent operation of the key 14 from gaining access to any lock 16. The CPU 56 is also configured, such that when it is once again in contact with the primary communication path 24 for the minimum valid time window, CPU 56 is configured to once again operate on its valid status marking unless a de-authorization message is received from the computer 12 to set the authorization status data as invalid.

Where the CPU 56 of the key 14 recognizes valid authorization status data and upon initiation through, e.g., a pin and password entered into the key pad 32 of the key by a real estate professional, the CPU 56 is configured to send an instruction to the transmitter 54 for communication to the receiver 70 of the lock 16. In turn, the CPU 72 of the lock 16 receives the instruction along with the particular key's unique identifying code to grant access from the receiver 70 and energizes the lock mechanism 66 to do so.

Following sending the instruction to the lock 16, the CPU 56 of the key 14 is configured to send usage data to the computer 12 under a particular key identifier, a unique lock identifier and time of access for the lock 16. Also, in one embodiment, the CPU receives global positioning satellite data from the GPS 48 and then additionally forwards the location of the key 14 in accessing the particular lock 16 to the computer 12. Also, the CPU 56 may spool the usage data when not within the service area of the communications path 24.

In operation, when a real estate agent desires to show a particular house, the agent approaches within ten feet or so of a lock 16 located, e.g., on a door knob of a door to the particular house. Thereafter, the agent may use the keypad 32 of the key 14 to enter a username/password and any particular key sequence required for communicating an instruction to the lock 16 for opening of the door 40 of the lock 16. Thereafter, the agent may take a mechanical key out of the lock 16 for entry to the house. At this time the key 14 communicates the specific house showing information via primary communication path 24 to the computer 12.

Technical effects of the herein described method include determining whether authorization exists for gaining access to an entryway and where it exists effecting opening of the entryway. Other technical effects include communicating usage data to a remote computer for further processing.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

The invention claimed is:

1. An access system comprising:

a computer for communicating over a primary wireless communication path;

a lock including a lock circuit for communicating over a secondary wireless communication path, and for energizing a lock mechanism to unlock the lock based upon instructions received over the secondary wireless communication path; and a key including a key circuit for communicating with the computer over the primary wireless communication path, for communicating with the lock over the secondary wireless communication path, and for inductively coupling energy from the key to the lock to provide power to the lock circuit;

wherein the key is authorized to unlock the lock absent a de-authorizing instruction from the computer and absent a determination that the key has not been in contact with the computer over the primary wireless communication path for a predetermined time amount during a predetermined period of time.

2. The access system of claim 1, wherein the key and the lock communicate over the secondary wireless communication path by near field radio frequency communication.

3. The access system of claim 1, wherein the lock circuit includes a coil for receiving inductively coupled energy from the key, and a power supply coupled to the coil.

4. The access system of claim 3, wherein the key circuit includes a coil for transmitting inductively coupled energy to the coil of the lock circuit.

5. The access system of claim 1, wherein communications between the key and the lock are secured by a security code scheme.

6. The access system of claim 5, wherein the security code scheme changes after a predefined time period.

7. The access system of claim 1, wherein the primary wireless communication path comprises a wireless telecommunication system.

8. The access system of claim 1, wherein the key circuit configured to generate and communicate usage data to the computer comprising at least one of a unique lock identifier of the lock, and a time of access of the lock.

9. The access system of claim 1, wherein the lock circuit is configured to be at least partially energized and/or partially recharged by the inductively coupled energy from the key.

10. The access system of claim 1, wherein the lock is located on a lock box used in real estate sales.

11. An access system comprising a plurality of locks, a plurality of keys, and a computer disposed at a remote location from the keys and locks, wherein:

each lock is configured to receive instructions from the keys and to energize a lock mechanism to unlock the lock;

the computer is configured to communicate with the keys over a primary wireless communication path to receive usage data from the keys and to send de-authorization instructions to the keys; and each key is configured to communicate over the primary wireless communication path with the computer, communicate with the locks over a secondary wireless path, and to supply inductively coupled energy to at least partially energize or recharge a lock with which the key is communicating;

wherein each key is authorized to unlock one of the locks absent a de-authorizing instruction received over the primary wireless communications path from the computer and absent a determination that the key has not been in contact with the computer over the primary wireless communication path for a predetermined time amount during a predetermined period of time.

12. The access system of claim 11, wherein communications between the keys and the locks are secured by a security code scheme that changes after a predefined time period.

13. The access system of claim 11, wherein the primary wireless communication path comprises a wireless telecommunication system.

14. The access system of claim 11, wherein each of the plurality of locks and each of the plurality of keys is configured to communicate over the secondary wireless communication path using near field radio frequency communications.

15. An access device for use in a system having a lock that is configured to energize a lock mechanism to unlock the lock based on received instructions, and a computer disposed a remote location from the lock, the access device comprising:

a key configured to communicate with the computer via a primary wireless communication path and to communicate with the lock over a secondary wireless communication path, wherein the key is authorized to unlock the lock absent a de-authorizing instruction from the computer and absent a determination that the key has not been in contact with the computer over the primary wireless communication path for a predetermined time amount during a predetermined period of time, and wherein the key is configured to deliver inductively coupled energy to the lock to at least partially supply power required to operate the lock.

16. The device of claim 15, wherein communications over the secondary wireless communication path between the key and the lock are secured by a periodically changing security code scheme.

17. The device of claim 15, wherein the primary wireless communication path comprises a wireless telecommunication system.

18. The device of claim 15, wherein the lock and the key are configured to communicate over the secondary wireless communication path using near field RF communications.

19. The access system of claim 15, wherein upon a determination that the key has not been in contact with the computer over the primary wireless communication path during and/or lasting a predetermined period of time, the key de-authorizes itself.

* * * * *